US008724162B2

(12) United States Patent
Conlon (10) Patent No.: US 8,724,162 B2
(45) Date of Patent: May 13, 2014

(54) SYSTEMS AND METHODS FOR IMPLEMENTING USER-CUSTOMIZABLE OPERABILITY FOR IMAGING OPERATIONS IN IMAGE FORMING DEVICES USING SELECTABLE PLATEN SHEET RULERS

(75) Inventor: Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 247 days.

(21) Appl. No.: 13/427,858

(22) Filed: Mar. 22, 2012

(65) Prior Publication Data

US 2013/0250313 A1    Sep. 26, 2013

(51) Int. Cl.
*G06K 15/10* (2006.01)
*G06F 15/00* (2006.01)
*G06K 15/00* (2006.01)

(52) U.S. Cl.
USPC ............ 358/1.5; 358/1.1; 358/1.12; 358/1.18

(58) Field of Classification Search
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

PUBLICATIONS

Conlon; U.S. Appl. No. 13/155,756, filed Jun. 8, 2011; Frame-Based Coordinate Space Transformations of Graphical Image Data in an Image Processing System.
Conlon; U.S. Appl. No. 13/155,723, filed Jun. 8, 2011; "Image Operations Using Frame-Based Coordinate Space Transformations of Image Data in a Digital Imaging System".

*Primary Examiner* — Thierry L Pham
(74) *Attorney, Agent, or Firm* — Ronald E. Prass, Jr.; Prass LLP (57) ABSTRACT

A system and method for implementing selectable platen sheet rulers as one of technology-based dynamically adaptable platen sheet rulers or physically-replaceable platen sheet rulers or a plurality of physically-replaceable platens having associated with each a permanently-affixed set of platen sheet rulers for device emulation, are provided. The user is provided with a mechanism by which to select a different origin for imaging operations in an image forming device. To enable emulation on the image forming devices, selectable rulers are employed. Dynamically-adaptable rulers include liquid crystal display (LCD) technology, light emitting diode (LED) arrays or similar tools to configure platen sheet ruler displays to frame a platen of the image forming device to enable real-time changing of the platen sheet rulers. Separately, physically-replaceable rulers such as, for example, one of "snap-in" rulers that are changeable with respect to a set platens in the image forming device are provided.

16 Claims, 5 Drawing Sheets

SYSTEMS AND METHODS FOR IMPLEMENTING USER-CUSTOMIZABLE OPERABILITY FOR IMAGING OPERATIONS IN IMAGE FORMING DEVICES USING SELECTABLE PLATEN SHEET RULERS

BACKGROUND

This application is related to U.S. patent application Ser. No. 13/155,756, filed Jun. 8, 2011, entitled "Frame-Based Coordinate Space Transformations Of Graphical Image Data In An Image Processing System," Ser. No. 13/155,723, filed Jun. 8, 2011, entitled "Image Operations Using Frame-Based Coordinate Space Transformations Of Image Data In A Digital Imaging System," and Ser. No. 13/420,157, filed Mar. 14, 2012, entitled "Systems And Methods For Implementing User-Customizable Operability For Imaging Operations In Image Forming Devices." These applications are co-owned by the Assignee of this application. The disclosures of the related applications are hereby incorporated by reference herein in their entirety.

1. Field of Disclosed Subject Matter

This disclosure relates to systems and methods for implementing user-customizable operability for imaging operations in image forming devices using selectable platen sheet rulers.

2. Related Art

Office level image forming devices combine image forming processes and associated media handling and finishing processes in a single device. What is not clear to the common user is that any particular imaging task or job requested by the user to be carried out by the office level image forming device includes multiple individual imaging operations each according to specified orthogonal orientations referenced to a specific origin in the image forming device. Different imaging devices behave differently with regard to these individual imaging operations. The differing behaviors can occur across imaging devices from a same manufacturer, or across like devices produced by differing vendors.

An exemplary and non-exhaustive list of individual imaging operations includes scaling or sizing, translation or image shift, mirroring or reflecting, and rotation of images in two dimensions and of image receiving media in three dimensions. These operations are generally specifically ordered for a particular image forming device. Individual image forming operations are non-commutative. Thus, differing orders of the operations manipulate an input image receiving media in different ways. Any change in an order of operations, however, as a set of transformations, will typically result in a different output unless modified in some manner that may or may not be available to the system designer and/or programmer. Frequently, it is only through an extensive iterative trial and error process that a user will get an imaging job to run as desired to produce, for example, the desired output orientation for an imaged and finished document on a particular device and this effort is not translatable to another device.

An example of an image forming device that exhibits the characteristic behaviors discussed above is a multi-function device (MFD). The MFD is an office level or light production image forming and media handling device that incorporates multiple common image forming and media handling functionalities including printing, scanning, faxing, viewing and copying in a single unit. MFDs provide a smaller footprint in an office environment than would a combination of devices that individually carry out the respective image forming functions.

As is mentioned briefly above, conventionally, imaging operations, and an order of the imaging operations, such as rotation, scaling, and translation, are generally fixed within a device. These operations are generally fixed relative to a specific operation origin, and in a specific orientation (direction of operation) with respect to that origin. The origin used by the image forming device is generally specified according to placement of one or more platen sheet rulers positioned along one or more sides of the device platen. The origin is generally specified for an office level device and is most often indicated to a user by an origin graphic shown in one corner of the platen. Vendors often build the imaging hardware and then place a user interface on top of the hardware by which the user is able to communicate with the image processing system in a limited manner, but by which the user is unable to effect any change in the origin to, for example, specify a different origin from which imaging operations should take place.

Many times devices or fleets of devices, even when produced by a same manufacturer, use differing origin points and/or coordinate references as a basis by which to interpret descriptive labels for orientations of images and image receiving media in individual devices. Without a common frame of reference, the descriptive terms are left to the interpretation of the individual devices according to individual device frames of reference as individual devices carry out electronic image scanning and processing functions as well as mechanical image media handling and finishing functions.

In a broad context, overall imaging operations such as device specific scaling, translation, reflection, rotation and edge erase are individually undertaken relative to a particular coordinate space referenced to a particular origin for a particular device that may be completely different from another coordinate space referenced to another origin for another device. The coordinate spaces and origins by which a particular image forming device references image and image receiving media orientations can differ from device to device.

As indicated above, origins, directions of execution and orders of particular internal operations are often fixed for each individual image forming device. Conventionally, the user cannot generally select a different origin, i.e., a particular corner, the center, or an arbitrary point in the imaging frame, or a different order of operations for a particular device. The user cannot generally specify a different direction of rotation, or a different edge about which image media is to be flipped from, for example, a faceup to a facedown orientation.

The point at which the above difficulties may particularly manifest themselves is when the user enters a competitive environment. The user would prefer to approach any of the differing, apparently similar, devices and operate them in the same manner to achieve repeatable outcomes. Depending on a particular origin that is referenced by a particular system, the manner by which the sheet flows through the particular system, and how the platens and/or rulers are set up in the particular system, ordering of particular operations will likely result in an output from that particular system that differs from an output from another system, much to the customers' dissatisfaction.

SUMMARY OF THE DISCLOSED EMBODIMENTS

In view of identified shortfalls in conventional image forming devices, previous research by the inventor of the subject matter of this disclosure has defined a common framework for representation of image origins and coordinate spaces across multiple devices. See, e.g., co-owned U.S. patent application Ser. No. 13/155,756, entitled "Frame-Based Coordinate Space Transformations Of Graphical Image Data In An Image Processing System" and Ser. No. 13/155,723, entitled "Image Operations Using Frame-Based Coordinate Space Transformations Of Image Data In A Digital Imaging System."

In a three-dimensional system, there is a set of forty-eight definable coordinate systems that represent all of the possible orthogonal orientations for image receiving media in an image forming device. (Note that imaging occurs in a two-dimensional coordinate system. In the two-dimensional system, there is a set of eight definable coordinate systems that may simply be considered a subset of the set of forty-eight definable three-dimensional coordinate systems in which Z is consistently set to zero). One of the forty-eight variations represents the standard Cartesian coordinate system, and the other forty-seven variations are deviations from that standard. This set of forty-eight coordinate systems is based on the existence of six sets of XYZ orientations that can be mapped to each of the eight corners of a cube representing the three-dimensional system. These forty-eight coordinate systems can, in turn, be mathematically represented according to a corresponding set of forty-eight individual mathematical representations to respectively identify each of the coordinate systems.

Figure 1A:
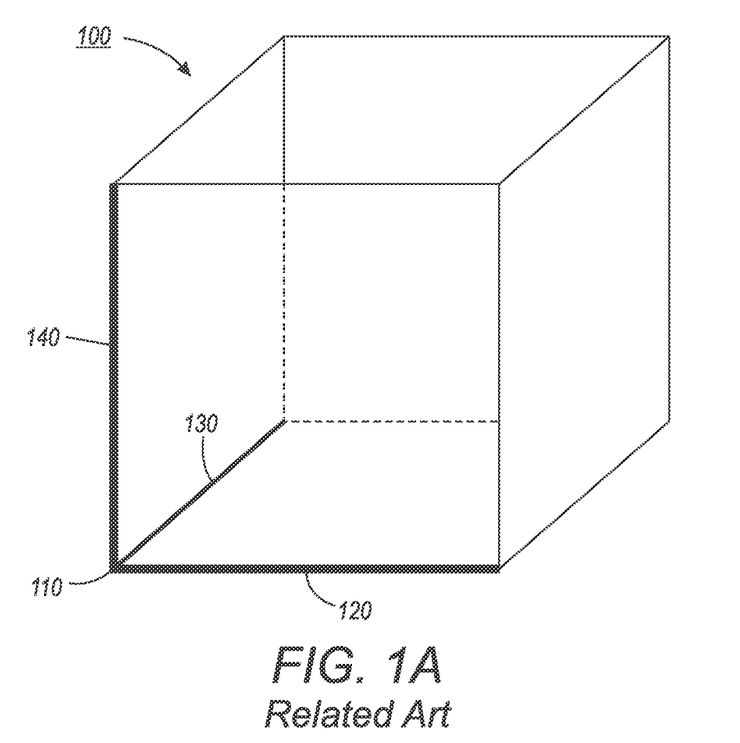
FIGS. 1A and 1B illustrate an example correspondence between a visual representation of a three-dimensional coordinate system and a corresponding mathematical representation according to this inventor's previous work as a foundation for the disclosed systems and methods.
Figure 1B:
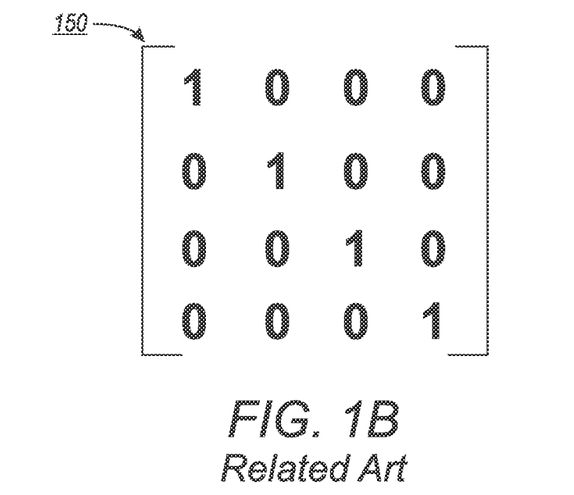

Examples of limited numbers of the above-described mathematical representations are presented in the above-identified co-owned U.S. Patent Applications. FIGS. 1A and 1B illustrate an example correspondence between a visual representation of a three-dimensional coordinate system 100 and a corresponding mathematical representation 150 according to this inventor's previous work as a foundation for the disclosed systems and methods. As shown in FIG. 1A, the coordinate system may be visually represented as having an origin 110 from which orthogonal axes, X-axis 120, Y-axis 130 and Z-axis 140 emanate. The origin 110 could be any one of the eight corners of the depicted cube. Varying combinations of the axes will emanate from each of those origins resulting collectively in the forty-eight coordinate systems discussed above. A mathematical representation 150, in a mathematical matrix format as shown in FIG. 1B, may be assigned to each of the forty-eight coordinate systems. The assignment of mathematical representations, in a mathematical matrix format, as shown, facilitates combining program operations (transformations) using matrix algebra as a processing medium for the systems and methods according to this disclosure. It should be noted that the specific mathematical representations shown in in FIG. 1B, and in the referenced documents, are only examples of the mathematical representation matrices that could be employed to define each of the forty-eight coordinate systems. Those of skill in the arts of image forming systems and mathematics will recognize that a particular three-dimensional coordinate system can be represented in a number of different ways mathematically in the form of a numerical matrix.

Regardless of their construct, the corresponding set of forty-eight individual mathematical representations, when taken together, define a mathematical group under the operations of rotation and reflection. With the forty-eight coordinate systems being defined or represented mathematically, matrix algebra is applied in manipulation of the individual mathematical transformations to rotate or reflect the orthogonal orientations represented by the coordinate systems to different ones of the forty-eight possible orientations. Each resultant orientation is a member of the mathematical group. Any series of multiple operations applied to a beginning orientation necessarily results in an ending orientation that is defined as one of the orientations in the group.

An advantage of finding a common definition or interpretation for the multiple non-standard coordinate systems, as they are applied to differing image forming devices, is that individual orientations of images and image receiving media between differing image forming devices can be commonly expressed and manipulated according to the common mathematical framework. Coordination can then be effected between operations in differing devices according to a user's desires. Application of the mathematical framework provides a capability by which the effects of changes that are made in an order of imaging operations can be accurately predicted and evaluated, obviating the requirement for conventional complex trial and error processes in order to achieve or maintain the desired output from any particular image forming device. The derived mathematical framework facilitates a level of automation and precision that was previously unavailable to system designers and/or programmers.

The above-referenced prior work of the inventor of the subject matter of this application described image and image receiving media orthogonal orientations using the group of forty-eight coordinate systems (or orthogonal orientation matrices). The solution presented in the previous work was limited to generating the specified set of mathematical representations forming the mathematical group that could then be manipulated using matrix algebra principles to provide an example of a common mathematical framework for interpreting the orthogonal orientations of images and image receiving media in image forming devices in a manner that is device and/or vendor agnostic.

What that work further provided, and was limited to, was a system and method for transforming graphics coordinates between different models of image processing systems. Using the method previously disclosed, a user could readily configure an image forming device to receive image data from a device platen in a first coordinate space and map the received data to a second coordinate space for subsequent processing independent of whether the two coordinate spaces share the same origins. Implementations were provided that enable a user to configure an image processing system to transform image data to any desired processing orientation.

In related U.S. patent application Ser. No. 13/420,157, a system and method are provided that combine the orientation approaches described above with reference to this inventor's previous work, and existing algorithmic approaches to provide a user with a mechanism by which to cause a particular image forming device to appear to operate generically according to the user's desires based on user manipulation at, for example, a graphical user interface (GUI).

In view of the body of this inventor's previous work, it would be advantageous to provide a visual indication to a user who walks up to an image forming device of a particular origin, and a set of axes of operations, that are being employed by the image forming device. Selectable platen sheet rulers may provide a readily apparent indication of a correct and current origin, and a set of axes of operations, in an image forming device that provides an option for specifying an origin and axes of operations for imaging operations that are different from the specified origin and axes of operations that the image forming device nominally references, and to which the image forming device's default or vendor installed platen sheet rulers are referenced. Such a capability affords a user an immediate indication of the "current" origin, and axes of operations, being employed by the image forming device, thereby reducing a possibility of confusion that often leads to user frustration in accomplishing image forming operations in the image forming device.

Exemplary embodiments of the systems and methods according to this disclosure may provide selectable platen sheet rulers as at least one of a set of technology-based dynamically adaptable platen sheet rulers or a set of physically-replaceable platen sheet rulers or a plurality of physically-replaceable platens having associated with each a permanently-affixed set of platen sheet rulers for device emulation.

Exemplary embodiments may provide the user with a mechanism by which to select a different origin, and set of axes of operations, for imaging operations in an image forming device. To enable emulation on the image forming devices selectable rulers may be employed.

Exemplary embodiments may provide adaptable rulers using, for example, liquid crystal display (LCD) technology, light emitting diode (LED) arrays or similar tools to configure platen sheet ruler displays to frame a platen of an image forming device in a manner that will enable real-time changing of a configuration of a platen sheet ruler to work with any platen corner designated as an origin for the imaging operations in the image forming device.

In exemplary embodiments, measurement values displayed according to an adaptable ruler scheme may be in ISO 216 format, North American (NA) format, a combination of these, or may be according to some other measurement convention. The measurement values may be adapted when using dynamically-adaptable rulers, according to, for example, a measurement of a size of an image receiving medium loaded in, or selected by, the image forming device for the imaging operation, or as defined by a user input of a user preference.

Exemplary embodiments may provide physically-replaceable rulers such as, for example, one of "snap-in" rulers that are changeable with respect to a set platen in the image forming device, or otherwise as complete "simple-to-replace," e.g., "drop-in," platen subassemblies that contain differing platen sheet rulers.

Exemplary embodiments may provide a mechanism for platen spatial calibration associated with automated or manual operations for selecting platen sheet rulers.

Exemplary embodiments may bypass conventional constraints that are based on a manner in which the hardware of the image forming device is manufactured and configured, and/or the corresponding constraints imposed on the software that drives the hardware. The user experience may be disconnected from the constraints of the image forming device in which the platen has a corner defined as an origin from which scanning proceeds according to designated axes of operations, with different image forming devices using differing corners, that conventionally cannot be modified as including differing origins.

Exemplary embodiments may be used to standardize a fleet of differing devices by a same or a different vendor to a single layout. In this manner, a competitor's image forming device can be generally made to "act" and "appear to act" as a vendor's device allowing a user to have a common user experience across the fleet of devices. Simply changing the "under-the-hood" behavior in the image forming device may not be sufficient to satisfy a user because the user takes direction on sheet placement from the provided platen sheet rulers. To fully emulate another image forming device, the placement of the sheet on the platen must be correct. Specifying (selecting) the platen sheet rulers according to changing origins an axes of operations provides an appropriate solution.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing user-customizable operability for imaging operations in image forming devices using selectable platen sheet rulers will be described, in detail, with reference to the following drawings, in which.

DETAILED DESCRIPTION OF THE DISCLOSED EMBODIMENTS

The systems and methods for implementing user-customizable operability for imaging operations in image forming devices using selectable platen sheet rulers according to this disclosure will generally refer to this specific combination of utilities or functions for those systems and methods. Exemplary embodiments described and depicted in this disclosure should not be interpreted as being specifically limited to any particular image forming device configuration, including any particular configuration of a platen and associated platen sheet rulers in the image forming device. No particular set of mathematical representations associated with a set of coordinate spaces (or orthogonal orientations) in two or three dimensions is implied, nor is any particular programming scheme implicated. Additionally, the systems and methods according to disclosure should not be interpreted as being specifically directed to any particular intended use. Any methodology for controlling operations in an image forming device that may include using selectable platen sheet rulers and benefit from the disclosed systems and methods is contemplated.

Specific reference to, for example, an image forming device throughout this disclosure should not be considered as being limited to any particular type of image forming device including, for example, any of a printer, a copier or a multi-function device. The term "image forming device," as referenced throughout this disclosure, is intended to refer globally to virtually any device or system that includes various capabilities for electronic image processing and/or image receiving media handling, including feeding and finishing, that generally includes a platen, as that term is understood by those of skill in the art. A platen is generally employed to receive an image receiving medium on which an image is rendered as an input image to be acted upon by the image forming device.

The systems and methods according to this disclosure will be described as being particularly adaptable to use in multi-function devices (MFDs), but the systems and methods according to this disclosure should not be considered as being limited by any particular combination of image processing and/or media handling component operations in an individual device.

Imaging operations may be controlled by a Graphical User Interface (GUI) on an image forming device, or otherwise by user interaction with a remote workstation that replaces, or augments, the functions of the GUI. In imaging operations, a specified origin, and set of axes of operations, for the imaging operations is significant to the correct production of an output product.

The disclosed systems and methods allow the user to walk up to the image forming device and specify an origin, and a set of axes of operations, for imaging operations in the image forming device and to position an image receiving medium with an image rendered thereon on a platen in a correct orientation according to the specified origin, and axes of operations, based on indications provided by selectable platen sheet rulers. The user's selection may be used to override the inherent coordinate space built into the hardware and/or the software of the image forming device. In this manner, the user's experience is decoupled from the specifics of the software or the hardware construct that defines the image forming device and operations undertaken thereby. Selectable platen sheet rulers may include indications of a particular origin in a manner that is intended to indicate proper placement of images on the platen of the image forming device.

Programmable platen sheet rulers may use LCD, LED or similar technologies to display an indication of an origin in any of the four corners of the platen, and to extend an indication of the rulers along one or more sides of the platen. Today, rulers often have both ISO and NA based values for measurements along the rulers according to the differing measurement conventions. With dynamically-programmable rulers a variety of approaches can be implemented. The dynamically-programmable rulers may be programmed, for example, to display particular measurement conventions based on user preferences. Otherwise, a measurement convention may be automatically entered based on a selected page size. For example, if an A4 sheet size is selected, the platen sheet ruler may be programmed to show metric units. Additionally, if programmed to display NA units, and an A4 sheet size is detected, the platen sheet rulers could change automatically, or prompt a user to confirm a change, to a metric measurement convention. In this manner, rather than being tied to a one-style fits all approach for displayed platen sheet rulers, the displayed rulers could change configurations, including characteristics such as granularities of units, based on selected preferences or sensed parameters. Dynamically-programmable platen sheet rulers may also provide some additional visual behaviors to highlight, for example, alignment errors, or to hint at correct positioning of an image on the platen.

In another embodiment, physically-replaceable "snap-in" platen sheet rulers may be provided to be individually fitted into accommodating channels, for example, at corners, and along sides, of a platen in an image forming device. These "snap-in" rulers may include special fasteners that lock the rulers securely into the channel, but that are also configured to be relatively easy to pop-out. Alternatively, larger, replaceable platen assemblies can be created for each of the four corner origin orientations.

The manufacturing of the physically-replaceable components will likely be somewhat flexible. Such flexibility comes with potentially-attendant alignment irregularities when the physically-replaceable components are installed in a vicinity of the platen in an image forming device. Device calibration can be undertaken to ensure high-quality alignment and subsequent high-quality imaging results from operations in the image forming device.

The unique concepts incorporated in this disclosure include the use of the selectable platen sheet rulers to support device emulation including an ability to dynamically change measuring conventions between ISO and NA units based on preferences, selection, or detection. Tolerances may be relaxed and flexibility enhanced by providing a step of calibration to attempt to ensure that, as rulers are changed, accuracy is not compromised, e.g. no shift or rotation is introduced if the rulers are slightly misaligned.

Figure 2:
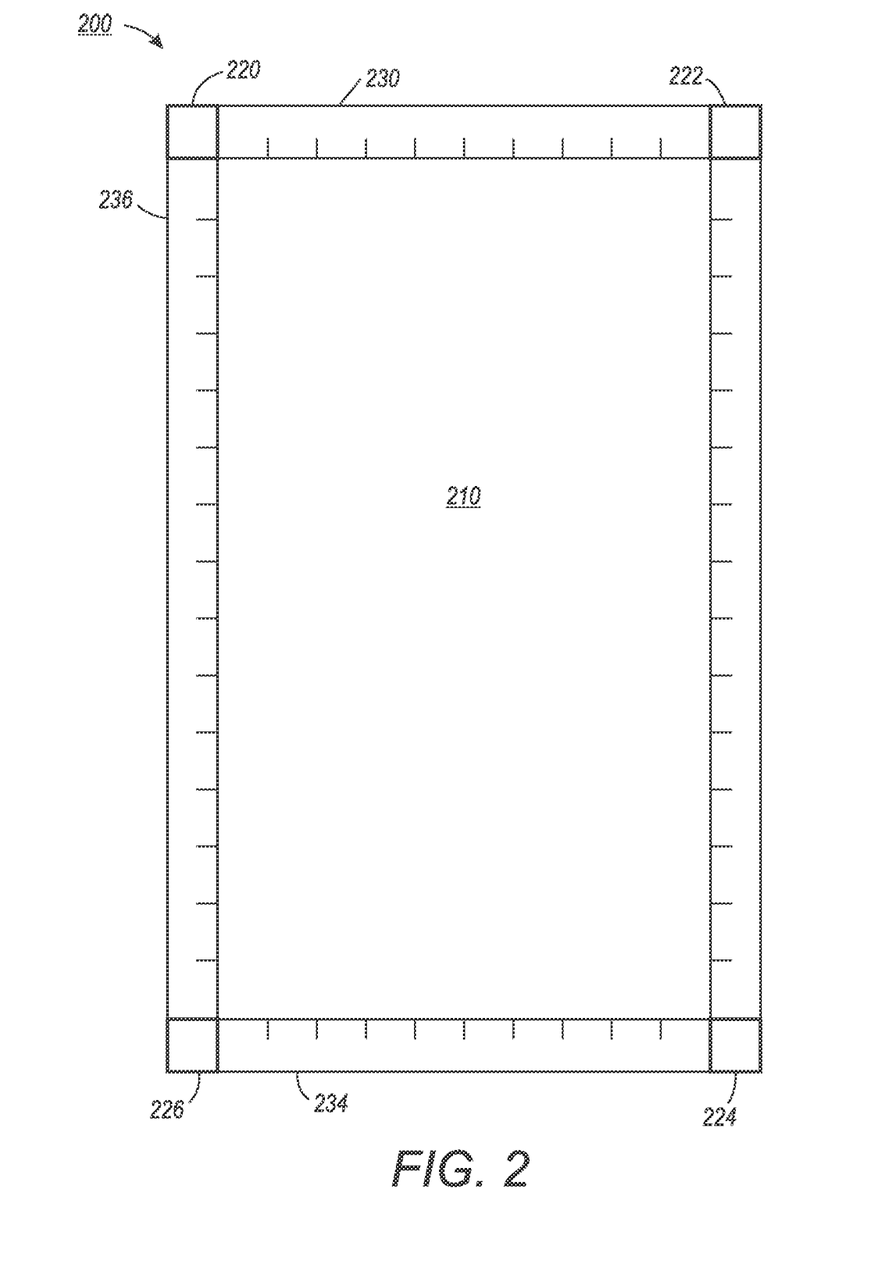
FIG. 2 illustrates a first exemplary configuration of a platen system for use in an image forming device having selectable platen sheet rulers in a form of technology-based dynamically-adaptable arrays according to this disclosure.

FIG. 2 illustrates a first exemplary configuration of a platen system 200 for use in an image forming device having selectable platen sheet rulers in a form of technology-based dynamically-adaptable arrays according to this disclosure. As shown in FIG. 2, the exemplary platen system 200 may include a platen 210 around the edges of which a series of dynamically-adaptable arrays may be placed. These dynamically-adaptive arrays may include, for example, one or more origin-specifying areas 220, 222, 224, 226 and one or more ruler areas 230, 232, 234, 236. Each of these specific areas may be composed of one of a liquid crystal display (LCD), a light emitting diode (LED) array, or other similar technology by which the exemplary platen system 200 may display, to a user, an indication of an origin, and rulers, in a manner that mimics conventional fixed origin and ruler indications in image forming devices.

Although shown as discrete ruler image areas in FIG. 2, it should be appreciated that the individual areas 220-236 may be portions of a continuous array that frames the platen 210. Separately, it should be recognized that, although depicted in FIG. 2 as completely framing the platen 210, in an image forming device that provides limited options for a user to select a particular origin, and axes of operations, respective imaging components for displaying origins and rulers may be positioned only at those points around the platen 210 that may be commensurate with the options afforded the user.

As shown in FIG. 2, the one or more ruler areas 230-236 include indications of measurement values, according to a particular measurement convention, along their respective lengths or widths. In exemplary embodiments of a fully-adjustable dynamically-adaptable system, a variety of approaches can be implemented for providing these indications of measurement values. The involved (current) measurement value convention may be automatically entered based on a selected page size. For example, if an A4 sheet size is selected the ruler could be programmed to show metric units. Additionally, if programmed to display NA units, and an A4 sheet size is detected according to known detection means for sizing a particular input image sheet placed on the platen 210, the measurement value convention could change automatically from one unit system to another, or provide a query to a user via, for example, user interface, notifying the user of a detected sheet size and requesting that the user confirm a change to an alternate measurement convention. In this manner, the displayed ruler areas 230-236 could have their specific configurations, including characteristics such as granularities of units, changed based on selected preferences or sensed parameters to enhance ease of operation and an overall user experience.

Dynamically-adaptable platen sheet rulers may also provide some additional visual behaviors to highlight alignment errors or hint at correct positioning of an image sheet when an improper placement of an image sheet that is not with respect, for example, to a selected origin is detected. These additional visual behaviors may include increasing illumination of a particular area of an origin or ruler array, or flashing, for example, an indication at a particular position to highlight to a user that the image forming device perceives an "out-of-position" condition for an input image sheet on the platen 210.

Figure 3:
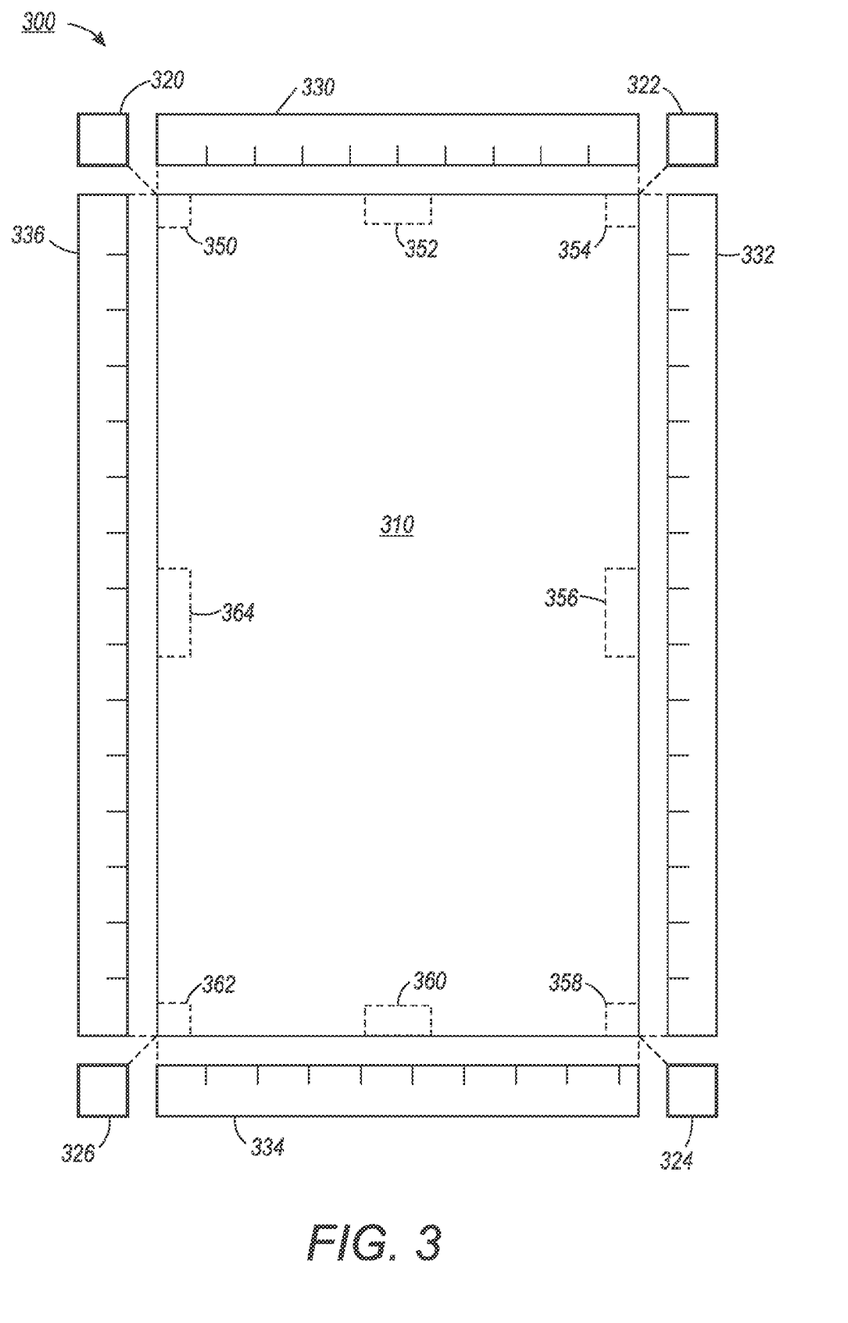
FIG. 3 illustrates a second exemplary configuration of a platen system for use in an image forming device having selectable platen sheet rulers in a form of physically-replaceable components having associated with them at least one position and calibration sensor according to this disclosure.

FIG. 3 illustrates a second exemplary configuration of a platen system 300 for use in an image forming device, including selectable platen sheet rulers in a form of physically-replaceable components having associated with them at least one position and calibration sensor according to this disclosure. As shown in FIG. 3, the exemplary platen system 300 may include a platen 310 around the edges of which may be placed one or more physically-replaceable components. These physically-replaceable components may include, for example, one or more origin-specifying components 320, 322, 324, 326, and one or more ruler components 330, 332, 334, 336. Each of these specific components may be formed in a manner that provides an ability to snap the components into place in a manner that holds the individual components securely with respect to the platen 310, while affording a user capacity to easily remove and replace the components.

Although shown as a series of eight discrete components in FIG. 3, it should be appreciated that the individual components 320-336 may be combined in any manner of subassemblies in order to partially frame the platen 310. Separately, it should be recognized that, although depicted in FIG. 3 as providing a set of individual components that completely frames the platen 310, individual components may be provided in appropriate locations around the platen 310 in a manner that does not completely frame the platen 310.

As shown in FIG. 3, the one or more ruler components 330-336 may include indications of measurement values along their respective lengths or widths. In exemplary embodiments, a full set of physically-replaceable rulers may include individual ruler components that implement a variety of approaches for providing these indications of measurement values. The full set of physically-replaceable rollers may display a plurality of particular measurement value conventions based on user-identified preferences.

A series of sensors 350-364 may be provided at appropriate positions around the platen 310 to sense at least one of a positioning of an origin or ruler component in an area surrounding the platen 310 that is monitored by one of the series of sensors 350-364. The sensors may comprise any known construction and/or functioning that may allow the image forming device with which the platen 310 is associated to (1) sense the presence of an origin or ruler component in the vicinity of the sensor; (2) determine a correct position of the origin or ruler component in the vicinity of the sensor to aid, for example, in a calibration technique based on the placement of the origin or ruler component in the vicinity of the sensor; and (3) sense a configuration of the origin or ruler component positioned in the vicinity of the sensor. Regarding this last sensed capability, a measurement value convention for, for example, one or more ruler components may be automatically sensed. In instances, therefore, when a particular sheet size is selected, if the measurement convention and the units of the sheet size are not compatible, the image forming device may query a user via, for example, a user interface, whether the user desires to change the physically-replaceable ruler components with other ruler components displaying the "correct" measurement convention.

Those of ordinary skill in the art will recognize that, as with all physically-replaceable components, the possibility of misalignment exists. In instances where a specific ruler component is determined by a sensor with which the ruler component is associated to be out of alignment, a calibration scheme may be undertaken by the image forming device to determine, for example, a set of corrected values that may be applied to physically correct positioning of the rulers or that may be applied to input image data to correct for the misalignment of the rulers. Alternatively, sensed error could be modeled and matrix decomposition could be undertaken and a derived correction applied to (1) correct physical positioning of the rulers, (2) tweak the imaging or (3) perform downstream paper alignment with systems that may, for example, change an angle of a sheet of image receiving medium or perform a sheet shift in X and Y directions to compensate for the error.

In embodiments, one or more of the physically-replaceable components 320-336, as depicted in FIG. 3, may be permanently affixed to one or more replaceable platens 310. In such a configuration, origins and associated rulers may be specifically associated with individual replaceable platens that may be selected and installed to account for, for example, a user-selected origin for imaging operations in the image forming device. Sensors 350-364 may be positioned in a manner similar to that shown in FIG. 3 to function as described above for sensing and calibrating replaceable platen placement with the rulers permanently affixed to one or more replaceable platens 310.

According to the embodiments shown in FIGS. 2 and 3, a user can easily determine a specified origin, and axes of operations, for imaging operations in an image forming device. The user can accomplish this at a point where the user walks up to the machine. In this manner, operation of a particular image forming device, which has been decoupled from being defined by the underlying hardware or software in the image forming device, and is manipulable by user interaction via, for example, a user interface, will not frustrate the user based on ignorance as to which of the specified origins for imaging operations in the image forming device is currently in use.

Figure 4:
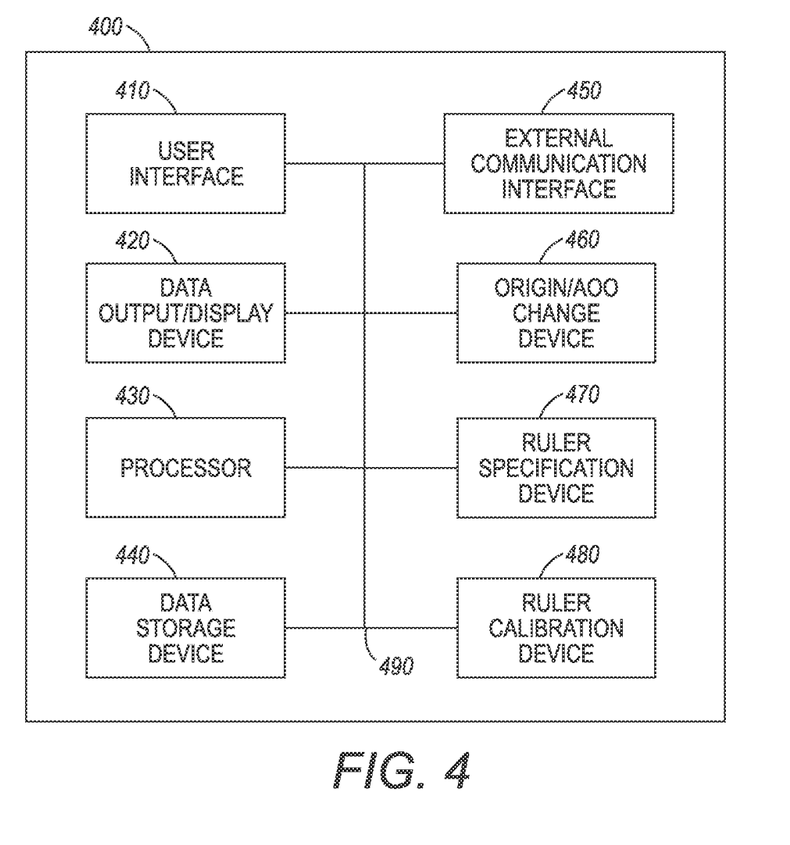
FIG. 4 illustrates a block diagram of an exemplary system for implementing user-customizable operability for imaging operations in an image forming device using selectable platen sheet rulers according to this disclosure.

FIG. 4 illustrates a block diagram of an exemplary system for implementing user-customizable operability for imaging operations in image forming devices using selectable platen sheet rulers according to this disclosure. The exemplary system 400 may be a component of a particular image forming device. Otherwise, the exemplary system 400 may be a standalone system apart from, but in wired or wireless communication with, an image forming device.

The exemplary system 400 may include a user interface 410 by which a user may communicate with the exemplary system 400. The user interface 410 may be configured as one or more conventional mechanisms common to computing devices such as, for example, a user's workstation that permits the user to input information to the exemplary system 400. The user interface 410 may be associated with an integral display capability of a data/display device 420 as components of a GUI in the image forming device. In such an embodiment, the user interface 410 may include, for example, some manner of touchscreen with "soft" buttons, or with various components for use with a compatible stylus, by which the user may be able to specify functions as discussed above, by touching specific regions of the touchscreen, or by dragging and dropping displayed icons on the touchscreen. Otherwise, the user interface 410 may be associated with a separate data output/display device 420 as part of a user workstation and may include, for example, a conventional keyboard and mouse, or a microphone by which a user may provide oral commands to the exemplary system 400 to be "translated" by a voice recognition program. Despite the location, or configuration, of the user interface 410, it is intended to encompass a medium by which a user may communicate specific operating instructions to the exemplary system 400.

The user interface 410 may be specifically employed in the context of this disclosure as a medium by which to specify a different origin, and axes of operations, and/or to confirm selection of a particular ruler scheme for selectable platen sheet rulers, be they dynamically-adaptable or physically-replaceable. See, e.g., the depictions in, and above accompanying descriptions regarding, FIGS. 2 and 3. The user interface 410 may also be employed to initiate, or otherwise confirm, a calibration scheme associated with the selectable rulers.

The exemplary system 400 may include a data output/display device 420 that may display information regarding user inputs provided via the user interface 410 as well as information regarding the functioning of the exemplary system 400. The data output/display device 420 may be used to display any manner of visual or graphical depiction that will facilitate user interaction with an image forming device according to the systems and methods of this disclosure. Specifically, user-selectable options for designating a specific origin, and axes of operations, and otherwise for monitoring operation or placement of selectable origins and rulers may be presented to the user for selection.

The data output/display device 420 may comprise any conventional means by which to display relevant data regarding the functioning of the exemplary system 400, and may provide the user, in conjunction with the user interface 410, a means to interactively communicate with, and control, the functions undertaken by the exemplary system 400. As indicated above, the data output/display device 420 may be co-located with the user interface 410 as components of a GUI in the image forming device with which the exemplary system 400 may be associated.

The exemplary system 400 may include one or more local processors 430 for individually operating the exemplary system 400 and carrying out specific portions of the functions of presenting dynamically-adaptable origins and rulers in image forming devices where dynamically-adaptable origins and rulers are available, or specific portions of the functions of sensing and calibrating presence of physically-replaceable origins and rulers in image forming devices where physically-replaceable origins and rulers are available. Processor(s) 430 may include at least one conventional processor or microprocessor and may comprise, for example, a Graphics Processing Unit (GPU) or a Central Processing Unit (CPU) as those terms are understood by one of skill in the art, that may be provided to interpret and execute instructions in cooperation with other system components for executing the disclosed processing schemes associated with the inclusion of selectable platen sheet rulers and origins, including for modification of behavior of the image forming device based on user inputs made via a user interface 410.

The exemplary system 400 may include one or more data storage devices 440 to store relevant data, and/or such operating programs as may be used by the exemplary system 400, and specifically the processor(s) 430, to carry into effect the functions of selectable platen sheet ruler and origin, and axes of operations, selection operations in the manner disclosed. Data storage device(s) 440 may include a random access memory (RAM) or another type of dynamic storage device that is capable of storing collected information, and separately of storing instructions for execution of system operations by, for example, processor(s) 430. Data storage device(s) 440 may also include a read-only memory (ROM), which may include a conventional ROM device or another type of static storage device that stores static information and instructions for processor(s) 430.

The exemplary system 400 may include one or more external data communication interfaces 450. The one or more external data communication interface(s) 450 may be particularly relevant in instances where the exemplary system 400 is displaced from, and in communication with, an image forming device with which the exemplary system 400 is associated. In such instances, the external data communication interfaces 450 may be provided to facilitate wired or wireless communication between the exemplary system 400 and the one or more image forming devices with which the exemplary system 400 may be associated.

The exemplary system 400 may include an origin, and axes of operations, (origin/AOO) change device 460 that may be specifically employed by the exemplary system 400 to, for example, receive a user-indicated origin, and set of axes of operations, that is different from an origin, and axes of operations, used by an image forming device. The origin/AOO change device 460, autonomously or in cooperation with the processor(s) 430 and/or the data storage device 440, may mathematically represent a coordinate system defined by the user-indicated origin, and axes of operations. The origin/AOO change device 460 may apply a transformation to the mathematical representation of the user-indicated origin, and axes of operations, that maps the user-indicated origin to a reference origin programmed into the image forming device with which the exemplary system 400 is associated. In this manner, the user is able to present an input image to the image forming device according to the user-indicated origin, and axes of operations, and the origin/AOO change device 460 provides the mechanism whereby an output from the image forming device is produced according to a user's desires regardless of the user-indicated origin, and axes of operations.

The exemplary system 400 may include a ruler specification device 470 that may be specifically employed by the exemplary system 400 to, for example, (1) specify operations in, and control the display of, dynamically-adaptable origins and rulers in the manner discussed above, and as outlined in the method described below, or (2) confirm positioning of physically-replaceable rulers and origins in an image forming device.

The exemplary system 400 may include a ruler calibration device 480 to be used particularly in instances where physically-replaceable rulers and origins are used. The ruler calibration device 480 may be employed by the exemplary system 400 to determine whether any calibration correction needs to be applied to an input image based on a sensed positioning of the physically-replaceable rulers or origins. The ruler calibration device 480 may be used, in cooperation with the processor(s) 430, or as a standalone system, to determine a magnitude of a calibration correction to be applied to input image data, and to apply that calibration correction to the input image data for processing in the image forming device.

All of the various components of the exemplary system 400, as depicted in FIG. 4, may be connected by one or more data/control busses 490. These data/control busses 490 may provide wired or wireless communication between the various components of the exemplary system 400 regardless of whether those components are housed within, for example, a single computing device as a component of an image forming device, a single computing device in communication with an image forming device, or individual ones of the depicted components are housed independently.

It should be appreciated that, although depicted in FIG. 4 as what appears to be an integral unit, the various disclosed elements of the exemplary system 400 may be arranged in any combination of sub-systems as individual components or combinations of components, integral to a single unit, or as separate components housed in one or more of a user workstation, an image forming device, or otherwise in some device, associated with one or more image forming devices. Therefore, no specific configuration for the exemplary system 400 is to be implied by the depiction in FIG. 4.

Figure 5:
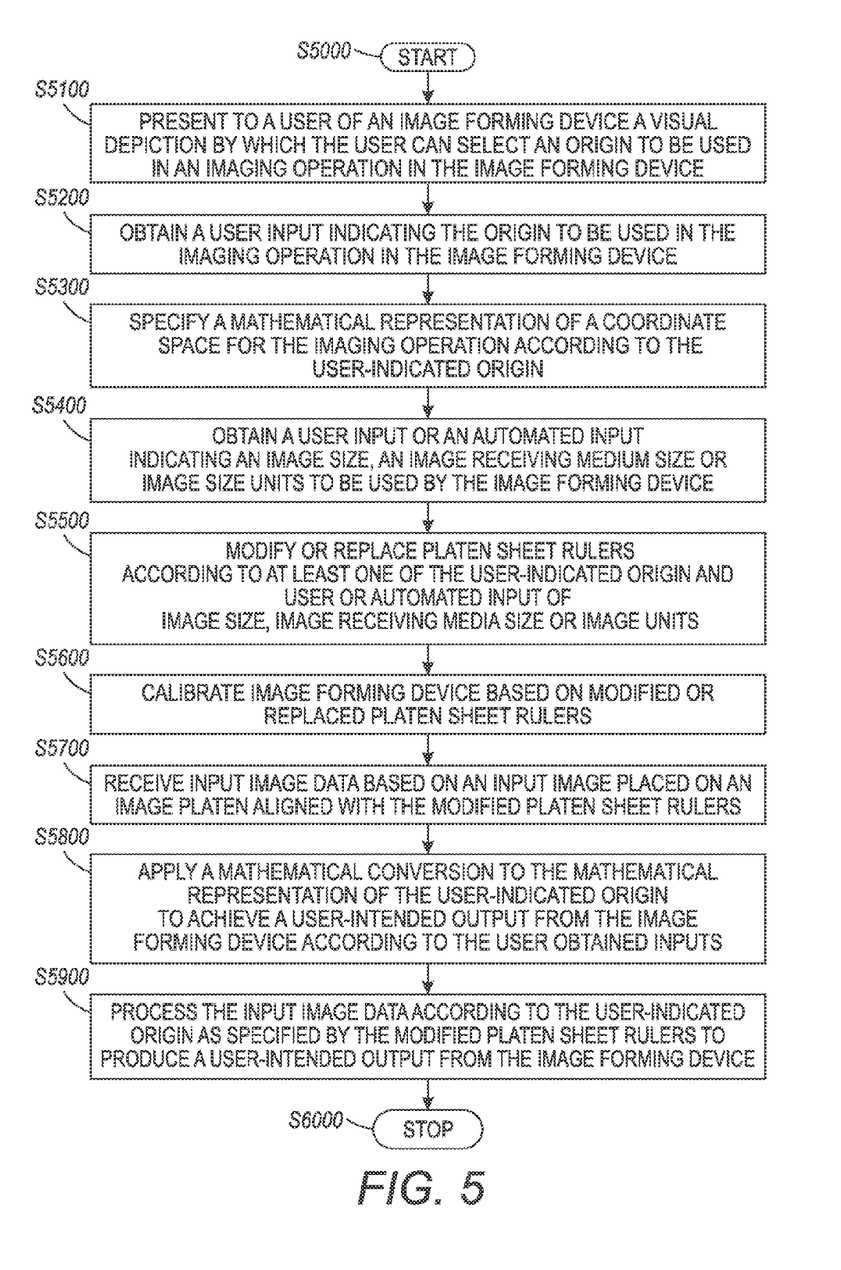
FIG. 5 illustrates a flowchart of an exemplary method for implementing user-customizable operability for imaging operations in an image forming device using selectable platen sheet rulers according to this disclosure.

The disclosed embodiments include a method for implementing user-customizable operability for imaging operations in image forming devices using selectable platen sheet rulers according to this disclosure. FIG. 5 illustrates a flowchart of such an exemplary method. As shown in FIG. 5, operation of the method commences at Step S5000 and proceeds to Step S5100.

In Step S5100, the user may be presented with a visual depiction by which the user can select an origin, and axes of operations, to be used in an imaging operation in an image forming device. The described visual depiction may provide the user with a simple means by which to select an origin, and axes of operations, to be used for the imaging operation according to any one of known conventional means. The user may, for example, simply highlight a different corner in a depiction of an image receiving medium displayed to the user on a display device such as, for example, a GUI. Operation of the method proceeds to Step S5200.

In Step S5200, a user's input indicating an origin, and axes of operations, to be used in the image forming operation may be obtained. The user's input may be obtained, for example, by receiving an indication via a GUI that includes a touch screen of a user's selection based on the user interacting with a touchscreen. Other conventional methods for receiving a user indication of an origin, and axes of operations, to be used in the imaging operation the image forming device, including by user interaction at a remote user workstation, are contemplated. Operation of the method proceeds to Step S5300.

In Step S5300, a mathematical representation of a coordinate space for the imaging operation may be specified according to the user's input. This mathematical representation may provide a common framework by which to define specific orientations and operations (transformations) that occur in the image forming device. Operation of the method proceeds to Step S5400.

In Step S5400, a user's input regarding at least one of an image size, an image receiving medium size, or image size units to be used in an imaging operation in the image forming device may be specified. Alternatively, the image receiving medium size, or image size units to be used in an imaging operation in the image forming device may be automatically detected. The user's input may be obtained, for example, by receiving an indication, via a GUI that includes a touch screen, of a user's selection based on the user interacting with the touchscreen. Other conventional methods for receiving the user indication, including by user interaction at a remote user workstation, are contemplated. Automatic detection may also be according to known methods. Operation of the method proceeds to Step S5500.

In Step S5500, platen sheet rulers used by the image forming device to specify, for example, an origin, or to display units according to a specific measurement convention, may be modified in instances where the rulers comprise dynamically-adaptable display devices, or may be replaced in instances where the rulers comprise physically-replaceable components, according to at least one of the user-indicated origin and user-input or automatically detected image size, image receiving medium size, or image units to be used for the imaging operation in the image forming device. Operation of the method proceeds to Step S5600.

In Step S5600, a calibration function for the image forming device may be undertaken based on the modification or replacement of platen sheet rulers. An outcome of the calibration may be to provide at least one calibration-based correction for image data in the imaging operation undertaken by the image forming device based on a measured deviation of a replaced platen sheet ruler from a nominal position for that ruler. Operation of the method proceeds to Step S5700.

In Step S5700, input image data may be received based on an input image being placed on an image platen in alignment with the modified or replaced platen sheet rulers. The image forming device may sense an out of position placement of the input image and alert the user regarding this condition. In instances where dynamically-adaptable rulers are employed, a display condition of one or more of those rulers may be adapted in a manner to indicate an error in placement condition for the input image and to suggest a correction to the user. Operation the method proceeds to Step S5800.

In Step S5800, a mathematical conversion may be applied to a mathematical representation of the user-indicated origin to achieve a user-intended output from the image forming device according to the user obtained inputs. In this manner, the system may effectively compute an emulation by which to modify input image data generically in any image forming device according to the user's inputs. Operation of the method proceeds to Step S5900.

In Step S5900, the input image data may be processed according to the user-indicated origin based on information received from the input image being positioned and aligned with respect to the modified or replaced platen sheet rulers in a manner that produces a user-desired output from the image forming device in a device agnostic manner. Operation of the method proceeds to Step S6000, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable processing and communicating means by which to carry into effect the user-selectable operations for directing imaging operations in an image forming device with reference to selectable origin and ruler cues for familiarity and ease of understanding. Although not required, elements of the disclosed exemplary embodiments may be provided, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks, or implement particular data types, in support of the overall objective of the systems and methods according to this disclosure.

As indicated in detail above, the disclosed origin and ruler indications may include dynamically-adaptable displays or physically-replaceable components.

Those skilled in the art will appreciate that other embodiments of the disclosed subject matter may be practiced with many types of image forming devices and processing systems associated with the image forming devices in many different configurations attached to, or otherwise associated with, the image forming devices.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred, or provided, over a network or via another communications connection, whether wired, wireless, or in some combination of the two, the receiving processor properly views the connection as a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 5, and the accompanying description, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A method for modifying operations in an image forming device, comprising:
   obtaining, by a processor, an indication of a separately-specified origin to be used for an imaging operation in an image forming device, the separately-specified origin being a different origin than that which is programmed into the image forming device;
   identifying a positioning of an input image sheet on a platen of the image forming device relative to the separately-specified origin by using selectable platen sheet rulers;
   receiving input image data according to the separately-specified origin based on the positioning of the input image sheet relative to the selectable platen sheet rulers;
   directing processing of the input image data to produce an output image from the image forming device, the image forming device outputting a result of the processing;
   identifying a transformation operation for converting a first coordinate system in which the input image data is received based on the separately-specified origin to a second coordinate system used by hardware components in the image forming device for the imaging operation;
   applying, with the processor, the identified transformation operation to the input image data to transform the input image data in the first coordinate system to image data in the second coordinate system,
   the directing of the processing of the input image data comprising directing processing of the image data in the second coordinate system for the imaging operation in the image forming device; presenting to a user a visual graphical display identifying a current origin for the imaging operation in the image forming device; and
   obtaining the indication of the separately-specified origin for the imaging operation based on user interaction with the visual graphic display by which the user identifies the separately-specified origin, the selectable platen sheet rulers comprising at least one dynamically-adaptable display device for displaying (1) a visual rendering of the separately-specified origin for the imaging operation at a corner of the platen and (2) a visual rendering of a ruler along at least one edge of the platen.

2. The method of claim 1, the visual graphic display being presented to the user on at least one of a graphical user interface of the image forming device and a display device of a separate user workstation associated with the image forming device.

3. The method of claim 1, further comprising indicating on the at least one dynamically-adaptable display device a visual depiction of a set of measurement values according to a first measurement convention.

4. The method of claim 3, the visual depiction of the set of measurement values according to the first measurement convention being selectable based on a user input of a measurement convention.

5. The method of claim 3, the visual depiction of the set of measurement values according to the first measurement convention being selectable based on at least one of an image size and an image receiving medium size for the imaging operation.

6. The method of claim 5, the visual depiction of the set of measurement values according to the first measurement convention automatically changing to a set of measurement values according to a second measurement convention based on the at least one of the image size and the image receiving medium size indicating a different measurement convention from the first measurement convention.

7. The method of claim 1, further comprising indicating on the at least one dynamically-adaptable display device a sensed non-alignment condition for the input image sheet.

8. The method of claim 1, the selectable platen sheet rulers comprising at least one physically-adaptable component for displaying (1) a visual rendering of the separately-specified origin for the imaging operation at a corner of the platen and (2) a visual rendering of a ruler along at least one edge of the platen, the at least one physically-adaptable component being removable and replaceable according to the separately-specified origin.

9. The method of claim 8, the at least one physically-adaptable component being configured to snap into a channel along the at least one edge of the platen.

10. The method of claim 9, further comprising sensing at least one of a presence of and an alignment of the at least one physically-adaptable component using a sensor in a vicinity of the channel along the at least one edge of the platen.

11. The method of claim 10, further comprising executing a calibration routine to determine and apply a correction factor to the input image data based on a sensed alignment error of the at least one physically-adaptable component.

12. The method of claim 8, the at least one physically-adaptable component comprising a set of physically-adaptable components, at least a first component of the set of physically-adaptable components indicating measurement values in a first measurement convention and at least a second component of the set of physically-adaptable components indicating measurement values in a second measurement convention.

13. A system for modifying operations in an image forming device, comprising:
a processor that is programmed to
receive an indication of a separately-specified origin to be used for an imaging operation in an image forming device, the separately-specified origin being a different origin than that which is programmed into the image forming device;
identify a positioning of an input image sheet on a platen of the image forming device relative to the separately-specified origin by using selectable platen sheet rulers;
receive input image data according to the separately-specified origin based on the positioning of the input image sheet relative to the selectable platen sheet rulers;
identify a transformation operation for converting a first coordinate system in which the input image data is received based on the separately-specified origin to a second coordinate system used by hardware components in the image forming device for the imaging operation;
apply the identified transformation operation to the input image data to transform the input image data in the first coordinate system to image data in the second coordinate system; and
direct processing of the input image data to produce an output image from the image forming device, the directing of the processing of the input image data comprising directing processing of the image data in the second coordinate system for the imaging operation in the image forming device; and
a user interface that presents to a user a visual graphical display identifying a current origin for the imaging operation in the image forming device, and receives from the user the indication of the separately-specified origin for the imaging operation based on user interaction with the visual graphic display by which the user identifies the separately-specified origin,
the selectable platen sheet rulers comprising at least one of a dynamically-adaptable display device and at least one physically-adaptable component that displays (1) a visual rendering of the separately-specified origin for the imaging operation at a corner of the platen and (2) a visual rendering of a ruler along at least one edge of the platen.

14. The system of claim 13, further comprising at least one sensor for sensing an out of alignment condition for the input image sheet relative to the selectable platen sheet rulers,
the processor being further programmed to display to the user an indication of the out of alignment condition for the input image sheet.

15. The system of claim 13, the at least one physically-adaptable component being configured to snap into a channel along the at least one edge of the platen,
the system further comprising at least one sensor for sensing an out of alignment condition for the at least one physically-adaptable component, and
the processor being further programmed to execute a calibration routine to determine and apply a correction factor to the input image data based on a sensed alignment error of the at least one physically-adaptable component.

16. A non-transitory computer-readable medium storing instructions which, when executed by a processor, cause the processor to execute the steps of a method comprising:
obtaining an indication of a separately-specified origin to be used for an imaging operation in an image forming device, the separately-specified origin being a different origin that is programmed into the image forming device;
identifying a positioning of an input image sheet on a platen of the image forming device relative to the separately-specified origin using selectable platen sheet rulers;
receiving input image data according to the separately origin based on the positioning of the input image sheet relative to the selectable platen sheet rulers;
directing processing of the input image data to produce an output image from the image forming device, the image forming device outputting a result of the imaging operation;
identifying a transformation operation for converting a first coordinate system in which the input image data is received based on the separately-specified origin to a second coordinate system used by hardware components in the image forming device for the imaging operation;
applying, with the processor, the identified transformation operation to the input image data to transform the input image data in the first coordinate system to image data in the second coordinate system,
the directing of the processing of the input image data comprising directing processing of the image data in the second coordinate system for the imaging operation in the image forming device; presenting to a user a visual graphical display identifying a current origin for the imaging operation in the image forming device; and
obtaining the indication of the separately-specified origin for the imaging operation based on user interaction with the visual graphic display by which the user identifies the separately-specified origin, the selectable platen sheet rulers comprising at least one dynamically-adaptable display device for displaying (1) a visual rendering of the separately-specified origin for the imaging operation at a corner of the platen and (2) a visual rendering of a ruler along at least one edge of the platen.

* * * * *